Aug. 3, 1965 T. O. BAUMBACH 3,198,886

CIRCUIT ARRANGEMENT FOR TRANSMISSION OF SIGNALS

Filed Nov. 2, 1960 2 Sheets-Sheet 1

INVENTOR
THORKILD OLOFSSON BAUMBACH
BY Hane and Nydick
ATTORNEYS

INVENTOR
THORKILD OLOFSSON BAUMBACH
BY Hane and Nydick
ATTORNEYS

United States Patent Office 3,198,886
Patented Aug. 3, 1965

3,198,886
CIRCUIT ARRANGEMENT FOR TRANSMISSION OF SIGNALS

Thorkild Olofsson Baumbach, Hagersten, Sweden, assignor to Telefonaktiebolaget L M Ericsson, Stockholm, Sweden, a corporation of Sweden Filed Nov. 2, 1960, Ser. No. 66,718
Claims priority, application Sweden, Nov. 19, 1959, 10,846/59
1 Claim. (Cl. 179—18)

The present invention refers to signal transmission in automatic telephone systems in which a sender and a receiver are connected by means of a line. The receiver comprises receiving relays for receiving signals from the sender and registering means for registration of these signals. A signal transmitted from the sender to the receiver is maintained on the line until it is answered, by means of a return signal relay in the receiver which transmits a return signal from the receiver to the sender. The return signal causes the signal to be terminated, whereby the return signal from the receiver is terminated. A new signal may then be sent from the sender to the receiver.

Such a signal transmission is used in junction lines where signals may be sent similtaneously in both directions, for example at voice frequency signalling through toll lines with amplifiers.

The purpose of the invention is to prevent a division of the signal from the sender, as caused by an unintentional interruption in the connection between the sender and the receiver, being treated as two signals in the receiver.

The purpose of the invention is attained in the system of the invention by means of a circuit arranged in the receiver for operation of said return signal relay. This circuit is extended through contacts on the receiving relays and through a contact which is closed in the registering means upon registration of the continuously transmitted signal. The system of the invention further provides holding circuits for the return signal relay which maintain the relay energized after operation until the signal from the sender is terminated and at least so long that the return signal has a predetermined minimum duration. The system also provides a contact means which is kept actuated during the sending of the return signal and which interrupts the circuit between the receiving relays and the registering means in the receiver.

The invention will be further described with reference to the enclosed drawing.

Figure 1:
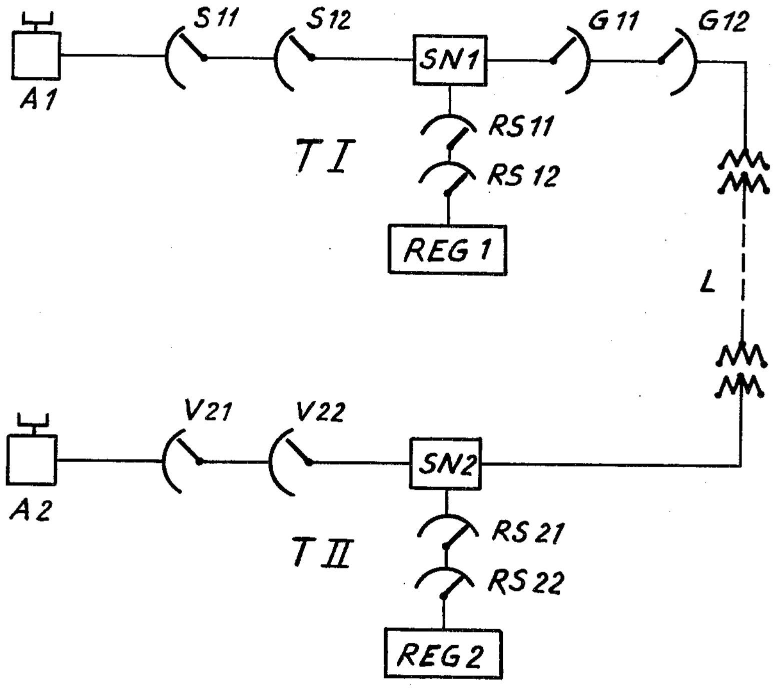
FIG. 1 shows a telephone system to which the invention may be applied.

FIG. 1 shows two telephone exchanges TI and TII connected by means of a line. The exchanges comprise line finders S11, S12, group selectors G11, G12 and line selectors V21, V22, and connecting circuit SN1, SN2, register selectors RS11, RS12 and RS21, RS22 respectively and registers REG1, REG2. A calling subscriber's instrument A1 in the exchange TI is connected through the finders S11, S12 to the connecting circuit SN1 and from here through the register selectors RS11, RS12 to the register REG1. It is assumed that the register REG1 receives signals which indicates the number of a called subscriber's instrument A2 in the exchange TII. The register REG1 prepares a circuit between REG1 in the exchange TI and REG2 in the exchange TII. The circuit passes the register selectors RS12, RS11, the connecting circuit SN1, the group selectors G11, G12, the line L, the connecting circuit SN2 and the register selectors RS21, RS22. The number of the called subscriber's instrument A2 is transmitted from REG1 to REG2, whereupon the register REG1 is disconnected. The register REG2 sets the selectors V21, V22 and is disconnected whereupon a telephone communication between A1 and A2 is obtained.

The number transmission between the registers REG1 and REG2 is supposed to occur by means of voice frequency signals according to one of the following two alternatives.

(a) From the register REG1 a voice frequency combination is sent out which indicates the digit in the number which is to be transmitted. This signal remains on the line until to a return acknowledgment signal from register REG2 indicates that the digit has been received and registered. The return signal causes register REG1 to terminate its signal, which in its turn has the effect that register REG2 terminates the return signal and is switched for receiving the next digit. After termination of the return signal the register REG1 sends the next digit of the number in the form of a new voice frequency signal.

(b) From the register REG2 a voice frequency signal is sent which indicates that the register has been connected and is ready to receive numerical signals from the register REG1. This signal remains on the line until register REG1 sends out a voice frequency combination which indicates the digit to be transmitted. When this numerical signal has been received and is registered in register REG2, the voice frequency signal will be interrupted which signifies to register REG1 that the numerical signal is terminated. This causes in register REG2 a switching for receiving the next digit, whereupon the voice frequency signal, which indicates that register REG2 is ready to receive a new numerical signal, will be connected again.

In the alternative (a) register REG1 is a sender and REG2 a receiver which sends return signals. In the alternative (b) register REG2 is a sender and REG1 is a receiver which sends return signals representing the digits of the subscriber's number. Whichever alternative is used, a signaling system is obtained that causes a rapid but sure switching process without unnecessary intervals between the signals.

Figure 2:
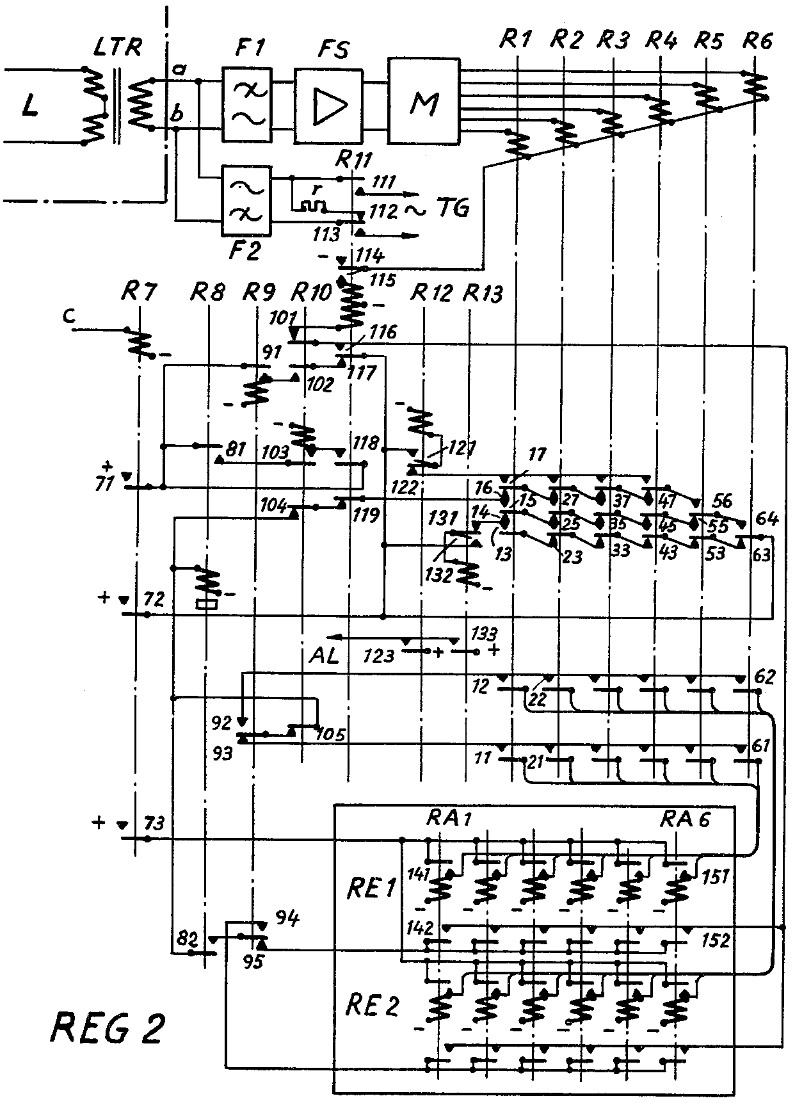
FIG. 2 shows a circuit arrangement according to the invention.

In systems provided with voice frequency signalling, especially when amplifiers are included in the system, interruptions may arise which are more often than not of short duration but disturb the signal transmission nevertheless. In order to neutralize the effect of these interruptions, the receiver, for example register REG2, is designed according to FIG. 2. Here LTR is a line transformer, F1 and F2 are filters, FS is an amplifier and M a selective receiving device that distributes six different voice frequencies and repeats signals, comprising these frequencies, to six relays R1–R6 corresponding to the frequencies. In FIG. 2 there are furthermore shown a registering device comprising two digit storing devices RE1 and RE2 respectively and a number of relays R7–R13, of which R11 is a return signal relay. For the return signal a voice frequency generator TG is provided which through the filter F2 is connected to the transformer LTR and the line L.

Three wires *a*, *b* and *c* lead to the register. When the register is busy, the relay R7 will be operated in a circuit through the C-wire. The contacts 71–73 close. A voice frequency signal is connected to the line L, passes the filter F1 and the amplifier FS, is read at the receiver M and energizes two of the receiving relays R1–R6. Each voice frequency signal consists of two voice frequencies selected among six voice frequencies which each operate one of the six receiving relays R1–R6.

A contact chain 13–17, 23–25, 33–35, 43–45, 53–55, 63–64 together with two control relays R12 and R13 control the signals so that the same comprise not more or less than two voice frequencies. It is assumed that the signal coming from the line L comprises the frequencies corresponding to the relays R1 and R6. If only the relay R1 is energized, a circuit is completed from +, through the contacts 72, 63, 53, 43, 33, 23, 13 and 131 and the winding of the relay R13 to negative. The relay R13 is energized. The contacts 131–133 are actuated. The relay R13 is then held in a circuit through the contacts 72 and 132 and an alarm signal is sent through the contact 133 and the wire Al to signal that a false signal has been received.

If only the relay R6 is energized, relay R13 is operated in a circuit from +, through the contact 64, 55, 45, 35, 25, 14 and 131. If a third relay, for example R5, is energized simultaneously with R1 and R6, a circuit is completed for the control relay R12 from +, through the contacts 72, 64, 56, 47, 37, 27, 17 and 122 and the winding on R12 to negative. Relay R12 is energized. The contacts 121–123 are actuated. The relay R12 is held in a circuit through the contacts 72 and 121. A circuit signifying a false signal is closed by the contact 123.

If a correct voice frequency signal is received in the register REG2, the relays R1 and R6 are energized. The contacts 11–17 and 61–64 are actuated. The following circuits are completed for the relays R8, RA1 and RA6: +, contact 72 contacts 64, 55, 45, 35, 25 and 15, and 119 and 104, through the winding of the relay R8, to negative, and also through the contacts 105 and 93 to negative through the contact 11 and the winding of the relay RA1 and through the contct 61 and the winding of the relay RA6. The three relays R8, RA1 and RA6 are energized. The contacts 81–82, 141–142 and 151–152 are actuated. The relays RA1 and RA6 belong to the digit storing device RE1 and register the signal by being held, each in its holding circuit, through the contacts 141 and 151 respectively, and the contact 73.

As soon as the signal has been repeated, the following circuit will be completed, which is dependent on the fact that the signal is remaining on the line: +, contacts 72, 64, 55, 45, 35, 25, 15, 119, 104, 82, 95 and 142 and 152, the contact 101 and the upper winding of the return signal relay R11, to negative. Relay R11 is energized. The contacts 111–119 are actuated. This the contact 116 closes before 119 opens.

The resistance *r*, that is, a terminal impedance, is disconnected and the voice frequency generator TG is connected through the contacts 111 and 113, a return signal being sent through the filter F2 to the line L.

It is apparent from the above description that a return signal is not sent out unless the signal received has been registered and furthermore is sufficiently long to operate the return signal relay R11. An interruption of the signal occurring before the completion of these switching operations has only the effect that the receiver awaits the return of the signal. After the return signal relay R11 has been energized, the receiving circuit is interrupted by the contact 119 and the state of energization of the signal relays is of no importance.

The relay R10 receives current through the contacts 71 and 118 and is energized. The contacts 101–105 are actuated. The duration of the return signal is determined by the make-time of the relay R10. The relay R11 after operation has two holding circuits, one through the contact 116 and one through the contact 115. The first mentioned holding circuit is interrupted by the contact 101 on the relay R10, after a sufficiently long return signal has been sent. The second holding circuit comprises the upper winding on R11, contact 115 and the winding of those receiving relays R1 and R6 which have been operated by the incoming signal. By means of this holding circuit it is made certain that the return signal is received on the sender side, where it causes interruption of the signal sent. The relay R10 after operation is held in a circuit through the contacts 71, 81, and 103.

During the sending of the return signal the relay R8 is held operated through the following circuit: +, contacts 72, 116, 142 and 152, 95, 82, and the winding of R8 to negative. When the relay R11 releases its armature, the return signal will be terminated and relay R9 is energized in the following circuit: +, contacts 72, 117 and 102. The contacts 91–95 are actuated. The circuit for R8 is interrupted by the contact 116. The relay R8 is slow-releasing so as to secure the operation of the relay R9. The relay R8 releases and the contacts 81 and 82 open. The relay R10 releases. The relay R9 is held in a circuit through the contacts 71 and 91. The receiver is now ready to receive a new signal which will be registered in the digit storing device RE2 as the switching contacts 92–93 and 94–95 have been actuated.

I claim:

An automatic telephone system comprising a sender and a receiver connected by a line for transmitting voice frequently signals, said receiver including receiving relays energized by receiving voice frequency signals sent out from the sender through said line, registering means connected in circuit with said relays for registering said signals, and a return signal relay for sending a return signal through the line to the sender in response to a voice frequency signal receiver from the sender, said receiving relays and said registering means each having switch contacts connected in circuit and coacting to cause production of said return signal upon registration of the sent voice frequency signal in the registering means; hold circuit means for the return signal relay for holding the same energized until de-energization of the receiving relays and at least for a period of time such that the return signal has a predetermined minimum duration, and switch contact means actuated by the return signal relay and held during the sending of said return signal and thereafter for a predetermined period of time to interrupt the circuit connection between the receiving relays and the registering means, thereby preventing registration of any signal received by said receiving relays.

References Cited by the Examiner

UNITED STATES PATENTS

| | | | |
|---|---|---|---|
| 2,767,248 | 10/56 | Warman | 179—18 |
| 2,882,345 | 4/59 | Faulkner | 179—18 |
| 2,885,480 | 5/59 | Oberman | 179—18 |
| 2,897,283 | 7/59 | Pearce et al. | 179—18 |
| 2,921,986 | 1/60 | Boswau | 179—18 |

ROBERT H. ROSE, *Primary Examiner.*

L. MILLER ANDRUS, WALTER L. LYNDE, *Examiners.*